Patented June 6, 1939

2,161,026

UNITED STATES PATENT OFFICE 2,161,026

LIGHT STABILIZER FOR VINYL RESINS

Arthur K. Doolittle, South Charleston, W. Va., assignor to Carbide and Carbon Chemicals Corporation, a corporation of New York No Drawing. Application July 23, 1937, Serial No. 155,220

4 Claims. (Cl. 260—86)

This invention relates to stabilized vinyl resins and to compositions containing the same. It is particularly concerned with a stabilizing material for use with such resins to prevent deterioration by light.

As synthetic resinous bodies, vinyl resins are well known in the art, and their very valuable and beneficial properties as components of plastic compositions of various kinds have long been recognized. After the vinyl resin-containing compositions have been compounded and processed into molded and extruded articles, or are employed as constituents of coating compositions, the final products are usually employed under conditions which involve their exposure to light and consequently to its actinic effect. When exposed to light, particularly to ultra-violet radiations, discoloration and consequent deterioration of the resin composition may often be encountered.

I have found that this tendency to deteriorate on exposure to light may be substantially overcome by incorporating small amounts of antimony oxide in the vinyl resin.

Among the vinyl resins with which the invention is more particularly concerned are those such as may be made by the conjoint polymerization of vinyl halides with vinyl esters of aliphatic acids. Examples of resins of this class are those resulting from the conjoint polymerization of vinyl chloride with vinyl acetate, and which contain in the polymer from about 70% to 95% of vinyl chloride. Resins of this class are disclosed in U. S. Patent No. 1,935,577, to E. W. Reid.

In general, the invention comprises the incorporation of small but effective amounts of the light stabilizing agent with the vinyl resin, so as to cause the resinous body to be substantially unaffected by actinic light. While varying percentages of the stabilizer may be used, I have found that proportions of antimony oxide of from about 3.0% to about 30.0% of the weight of the vinyl resin are particularly efficacious. In order to obtain the most effective stabilizing action, the stabilizing agent should be intimately admixed with the resin, and it has been found that the quantities of the stabilizing agent used are not great enough to alter materially the other properties of the product, or to detract from the value of the resins for their customary uses, when the presence of a white pigment, such as antimony oxide, is not objectionable. A suggested method of incorporating the antimony oxide to insure its intimate dispersion in the polymerized vinyl compounds is by mechanical means, as when the resin is being worked on a differential roll mill. Other methods can of course be employed without departing from the spirit of the invention.

The following example is illustrative of the stabilized vinyl resin compositions of this invention containing antimony oxide:

Example I

A coating composition was made containing a vinyl resin as the film-forming constituent. The vinyl resin used was obtained by conjointly polymerizing vinyl chloride with vinyl acetate, and it contained about 87% by weight of vinyl chloride in the polymer. The resin was purified before use by extraction and partial precipitation from partial solvents to remove all unpolymerized material, catalytic residues, and more easily soluble polymeric fractions of lower average apparent molecular weight. The composition was as follows:

| | Per cent by weight |
|---|---|
| Vinyl resin | 15 |
| Antimony oxide | 1 |
| Titanium dioxide | 9 |
| Di(beta-butoxy ethyl)phthalate | 3.5 |
| Thinner | 71.5 |

The thinner was composed of:

| | Per cent by volume |
|---|---|
| Methyl isobutyl ketone | 40 |
| Dipropyl ketone | 10 |
| Toluene | 40 |
| Xylene | 10 |

This produced a white pigmented lacquer composition which was excellently suited for surface coating purposes. The resulting coatings, when exposed to indoor sunlight for as long as 60 days suffered no discoloration or loss of other valuable properties. By indoor sunlight is meant light that has passed through window glass before striking the exposed surface. White lacquered panels made according to the composition of Example I, but containng no antimony oxide showed an appreciable color change on exposure to indoor sunlight even after 30 days.

While the above example shows the use of my novel light stabilizer in a lacquer composition, other applications of antimony oxide as a light stabilizer will be apparent. For instance when milled into a plastic composition on a roll mill, molded into plaques and exposed to ultraviolet arc light to which the vinyl resins are ordnarily sensitive, it will effectively withstand the deteriorating effects of this light for considerable time. This is in marked contrast to unstabilized vinyl resin which on exposure to the same kind of light will very shortly become discolored and somewhat brittle.

The novel light stabilizer of this invention is a white pigment of high covering power and can be used with modification and addition agents, such as fillers, plasticizers, pigments, dyes, lakes, and the like, commonly employed in the elaboration of vinyl resins into industrial products where the presence of such a white pigment is not objectionable.

Specific examples have been given to show the use of suitable amounts of antimony oxide, other tests made with different proportions of the light stabilizer, vinyl resins, pigments and plasticizers, have established the fact that the use of antimony oxide in other proportions materially increased the resistance of deterioration by light of the stabilized compositions.

I claim:

1. Process for stabilizing light-sensitive vinyl resins including a vinyl halide polymerized therein against the discoloring and deteriorating effect of light, which comprises intimately combining said resin with a light stabilizing material essentially composed of antimony oxide in the proportion of from about 3% to about 30% of the vinyl resin weight.

2. A light stable resinous composition comprising a vinyl resin substantially identical with that resulting from the conjoint polymerization of a vinyl halide with a vinyl ester of an aliphatic acid and containing in the polymer about 65% to 90% of the vinyl halide and a light stabilizing agent essentially composed of antimony oxide intimately dispersed therein in amounts of from about 3% to about 30% of the weight of the vinyl resin.

3. A light stable resinous composition comprising a vinyl resin substantially identical with that resulting from the conjoint polymerization of a vinyl halide with a vinyl ester of an aliphatic acid and containing in the polymer about 65% to 90% of the vinyl halide and a light stabilizing agent essentially composed of antimony oxide intimately dispersed therein in amount of about 7% of the resin weight.

4. A light stable resinous composition comprising a vinyl resin substantially identical with that resulting from the conjoint polymerization of vinyl chloride with vinyl acetate and containing in the polymer about 70% to 95% of vinyl chloride and a light stabilizing agent essentially composed of antimony oxide intimately dispersed therein in amount of about 7% of the resin weight.

ARTHUR K. DOOLITTLE.